United States Patent
Mege

(10) Patent No.: US 8,284,864 B2
(45) Date of Patent: Oct. 9, 2012

(54) SIGNAL EMISSION BY PLURAL ANTENNAS

(75) Inventor: Philippe Mege, Bourg la Reine (FR)

(73) Assignee: EADS Secure Networks, Elancourt (FR)

( * ) Notice: Subject to any disclaimer, the term of this patent is extended or adjusted under 35 U.S.C. 154(b) by 99 days.

(21) Appl. No.: 12/669,829

(22) PCT Filed: Jul. 17, 2008

(86) PCT No.: PCT/FR2008/051348
§ 371 (c)(1),
(2), (4) Date: Jun. 16, 2010

(87) PCT Pub. No.: WO2009/013436
PCT Pub. Date: Jan. 29, 2009

(65) Prior Publication Data
US 2010/0290555 A1    Nov. 18, 2010

(30) Foreign Application Priority Data
Jul. 20, 2007   (FR) ...................... 07 05306

(51) Int. Cl.
*H04L 27/00* (2006.01)
(52) U.S. Cl. ........ 375/299; 375/267; 375/295; 370/334; 455/101
(58) Field of Classification Search .......... 375/299, 375/267, 295; 455/101; 370/334
See application file for complete search history.

(56) References Cited

U.S. PATENT DOCUMENTS

| | | | |
|---|---|---|---|
| 6,185,258 B1 | 2/2001 | Alamouti et al. | |
| 6,449,314 B1* | 9/2002 | Dabak et al. | 375/267 |
| 6,775,329 B2 | 8/2004 | Alamouti et al. | |
| 2001/0017903 A1* | 8/2001 | Naguib et al. | 375/347 |
| 2006/0093057 A1* | 5/2006 | Zhang et al. | 375/267 |
| 2007/0105508 A1 | 5/2007 | Tong et al. | |

FOREIGN PATENT DOCUMENTS
WO    2006017850    2/2006

* cited by examiner

*Primary Examiner* — Ted Wang
(74) *Attorney, Agent, or Firm* — Lowe Hauptman Ham & Berner, LLP

(57) ABSTRACT

A radio communication emitter includes at least two antennas for emitting a signal including encoded bits that are converted into symbols distributed on subcarriers and in time intervals. The emitter includes a signal divider for distributing the set of the signal symbols into as many disjoined subsets of signal symbols as the antennas that the emitter comprises. Each subset is dedicated to one of the antennas. The union of the subsets is the set of the signal symbols. Symbols are distributed in at least two subsets for at least one time interval or for at least one subcarrier of the signal. The antennas synchronously emit the symbol subsets. The symbol subsets can comprise a substantially identical number of symbols to reduce a deviation between the power peaks and the average power of the signal emitted by each antenna.

7 Claims, 4 Drawing Sheets

SIGNAL EMISSION BY PLURAL ANTENNAS

RELATED APPLICATIONS

The present application is based on, and claims priority from, FR Application Number 0705306, filed Jul. 20, 2007, and PCT Application Number PCT/FR08/051348, filed Jul. 17, 2008, the disclosures of which are hereby incorporated by reference herein in their entireties.

The present invention relates to the emission of a radio electric signal from an emitter comprising at least two emit antennas. More particularly, the invention is directed to the emission of a signal including symbols distributed according to frequency and time dimensions, having, for example, undergone a modulation according to an Orthogonal Frequency Division Multiplexing OFDM.

The invention finds applications in particular in the field of professional mobile radio (PMR) systems.

In the state of the art, it is known to make use of an emitter comprising plural emit antennas to reduce path attenuations undergone by the emitted signal, plural versions of the signal transmitted through a multipath channel being received in a receiver at different times.

U.S. Pat. No. 6,185,258 proposes to emit, for example, two symbols of a signal from first and second emit antennas at two successive times. At the first time, the first symbol and the second symbol are emitted respectively by the first and second antennas. At the second instant, the opposite or the conjugate or the opposite of the conjugate of the second symbol is emitted by the first antenna and the opposite or the conjugate or the opposite of the conjugate of the first symbol is emitted by the second antenna. Such a redundancy of the signal makes it possible to more simply determine the received signal and to benefit from a diversity gain of the order 2 due to both signal propagation channels in relation to both emit antennas.

The object of the invention is to benefit from the diversity related to at least two emit antennas of a radio communication emitter without emitting twice the same signal by the two emit antennas.

To achieve this object, a method in a radio communication emitter for emitting a signal by at least two antennas, the signal including encoded bits that are converted into symbols distributed on subcarriers and in time intervals, is characterized in that it includes the following steps:

distributing the set of the signal symbols into as many disjoined subsets of signal symbols as the antennas that the radio communication emitter comprises, each subset being dedicated to one of the antennas, the union of said subsets being the set of the signal symbols, symbols being distributed in at least two subsets for at least one time interval of the signal, and symbols being distributed in at least two subsets for at least one subcarrier, generating for each antenna a signal to be emitted including the symbols of the subset dedicated to said antenna, the symbols of the subset being distributed on the same subcarriers and in the same time intervals as those of the signal, and emitting synchronously the signals generated respectively by the antennas.

The symbols of the signal to be emitted by the emitter are distributed between the emit antennas of the emitter. Consequently, the contents of each useful information bit of the signal to be emitted is spread on the subcarriers and in time intervals of the signal after encoding and conversion into symbols, and is then distributed between the antennas of the emitter. A receiver receiving the subsets of symbols being emitted respectively by the emit antennas recovers a diversity related to the emit antennas after the received symbols have been decoded, while recovering the content of each useful information bit that has been distributed in a time-frequency reference system representing the subcarriers and the time intervals of the signal and between the emit antennas.

Each of the symbols of the signal to be emitted is emitted once and by one single emit antenna. Each subset of symbols emitted by an emit antenna thus includes a number of symbols lower than that included in the initial signal to be emitted.

Moreover, for each subset of symbols emitted by an antenna of the emitter, a low number of symbols is emitted simultaneously per time interval. The deviation between power peaks and the average power of the emitted signal is thus low. More particularly, the lower the number of symbols being emitted per time interval, the lower such a deviation. This makes it possible to reduce the linearization constraint in the emitting chain, and more particularly of the power amplifier and thus to improve the yield thereof.

According to another feature of this invention, the method can further comprise interleaving the encoded signal bits before being converted into the signal symbols.

The diversity related to the emit antennas can be emphasized by interleaving the encoded signal bits, and thus by a predetermined spread of the content of each useful information bit in the signal to be emitted on the subcarriers and in the time intervals of the signal to be emitted.

According to other features of this invention, the subsets of symbols can comprise a substantially identical number of symbols with respect to all the subcarriers and time intervals of the signal, or for each time interval of the signal, or even for each subcarrier of the signal.

Advantageously, the symbols respectively distributed towards the antennas can be equidistributed in the time intervals and/or on the subcarriers of the signal so as to benefit in a fair manner from the diversity related to each of the antennas in the emitter.

Each subset of symbols is completed by nil values in a time-frequency reference system representing the subcarriers and the time intervals of the signal.

The pattern of the signal emitted by each antenna of the emitter is identical to that of the initial signal to be emitted. Each antenna only emits the subset of symbols dedicated to the antenna, so that the processing of the signal received by the receiver for a given emit antenna is limited to the subset of symbols emitted by the given antenna.

The invention also relates to an emitter for emitting a signal by at least two antennas.

Finally, the invention relates to a computer program implemented in an emitter for emitting a signal by at least two antennas, the program including program instructions which carry out the steps according to the method of the invention when the program arrangement is executed in said emitter.

Other features and advantages of the present invention will become more clearly apparent on reading the following description of embodiments of the invention given by way of nonlimiting example and with reference to the corresponding appended drawings in which.

Generally speaking, the invention described hereinafter relates to a radio communication emitter in a digital cellular radio communication network. The emitter has at least two emit antennas and communicates with a receiver having one receive antenna or plural receive antennas. For example, the emitter and the receiver are respectively included in a base station and a mobile terminal and the receiver and communicate with each other on the basis of an orthogonal frequency division multiplexing OFDM.

In a first example, the radio communication network is a terrestrial, aeronautical or satellite digital cellular radio communication network, or a wireless local area network (WLAN), or a world wide interoperability microwave access (WIMAX) network, or a professional mobile radio (PMR) network.

In a second example, the radio communication network is an ad hoc wireless local area network with no infrastructure. The emitter and the receiver communicate with each other directly and spontaneously with no intermediary equipment for centralizing communication such as an access point or station or a base station.

In the radio communication network, interferences between symbols due to multiple propagation paths in a user signal and multiple access interferences between signals of several users are generated by the propagation in the propagation channel and degrade the quality of the received signal. Such degradation is reduced by estimating the transfer function of the propagation channel carried out, for example, by means of information known in advance to the receiver, such as a pilot sequence emitted by the emitter and distributed over pilot symbols placed in each OFDM signal frame at some positions in the two frequency and time dimensions.

Figure 1:
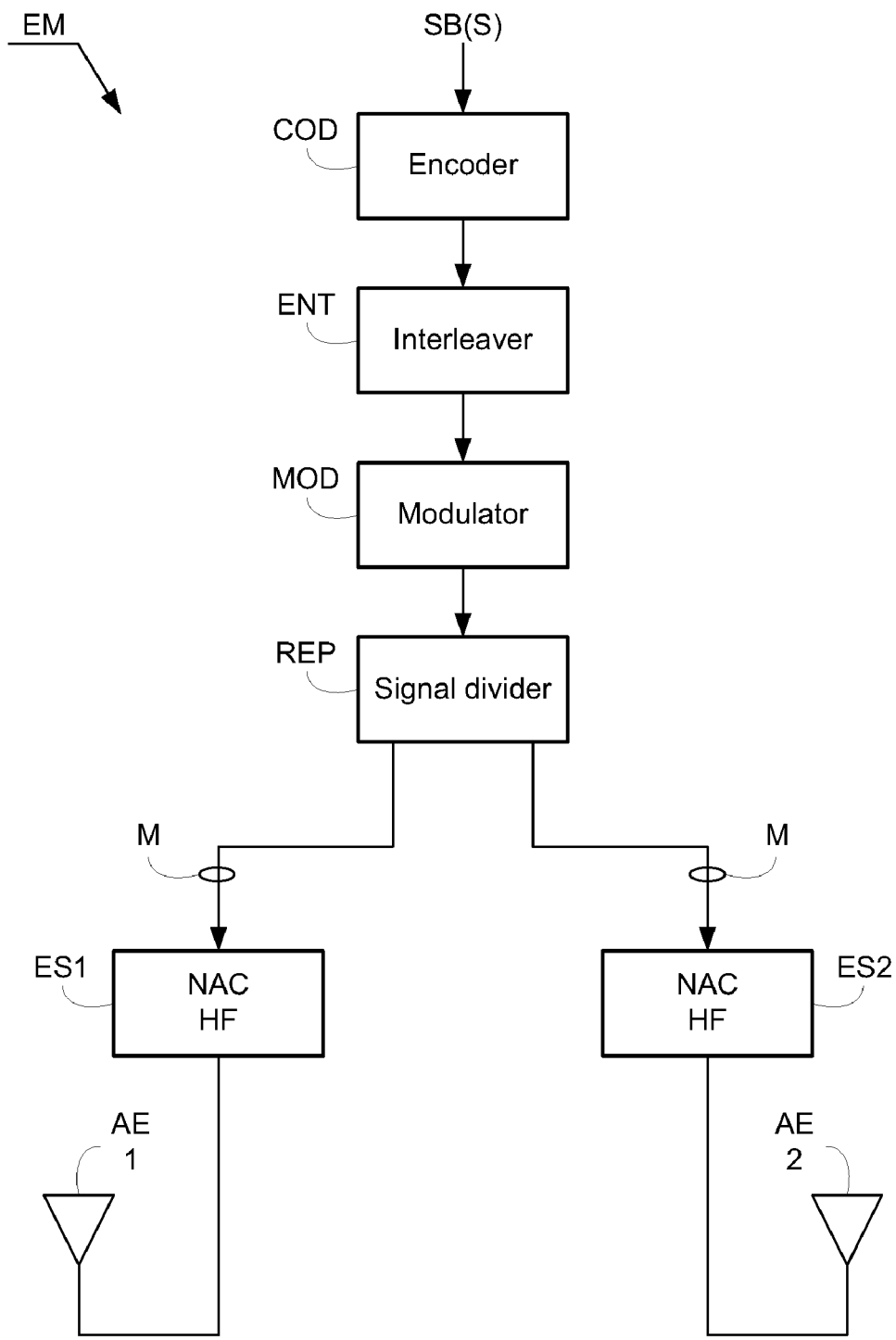
FIG. 1 is a schematic block diagram of a radio communication emitter with plural antennas according to the invention.

FIG. 1 shows functional means included in a radio communication emitter EM for implementing the method of the invention in a digital radio communication network. The emitter EM includes in particular a channel encoder COD, optionally an interleaver ENT, a modulator MOD, a signal divider REP and plural emit antennas. To avoid overloading FIG. 1, it will considered hereinafter that the emitter EM comprises at least two emit antennas AE1 and AE2, each being connected to the signal divider REP via a respective output stage ES1, ES2.

The emitter EM processes a radio frame of a signal S including a sequence of bits SB which are distributed and transmitted by means of the two emit antennas AE1 and AE2.

The useful information bits included in a bit sequence SB are encoded by the encoder COD, then, optionally interleaved by the interleaver ENT before being converted into symbols according to a multiplexing OFDM by the modulator MOD. The symbols are distributed on carriers being orthogonal therebetween and covering a frequency broadband and form an OFDM signal frame. Pilot symbols can be placed in the OFDM signal frame so as to make easier the estimation of the transfer function of the propagation channel between the emitter and a receiver upon receiving the frame.

For example, the signal S is to be emitted on M subcarriers in a frame divided into N time intervals of consecutive symbols each dedicated to the transmission of M symbols. The symbols are thus distributed in a time-frequency reference system representing the N time intervals and the M subcarriers of the signal to be emitted.

The symbols are provided to the signal divider REP which selects at each frame a subset of symbols with predetermined positions in the time-frequency reference system for each of the emit antennas. The subsets of symbols respectively selected for the emit antennas are disjoined subsets, the union of which is the set of symbols of the OFDM signal frame, each of the subsets optionally comprising pilot symbols in order to allow for the receiver to estimate the propagation channel from each of the emit antennas.

The signal divider REP provides a selected subset of symbols to each output stage ES1, ES2 connected to the respective emit antenna AE1, AE2. For example, the subset of symbols is transmitted to M parallel paths corresponding to the M subcarriers of the signal to be emitted.

In the output stage, the selected subset of symbols is modulated on the subcarriers, then the resulting signal undergoes a digital-to-analog conversion before being amplified and transposed at high frequency. The output stage provides, on the output, a signal to be emitted by the corresponding emit antenna.

The emit antennas thus emit in parallel signals each including different symbols for the duration of the radio frame.

Figure 2:
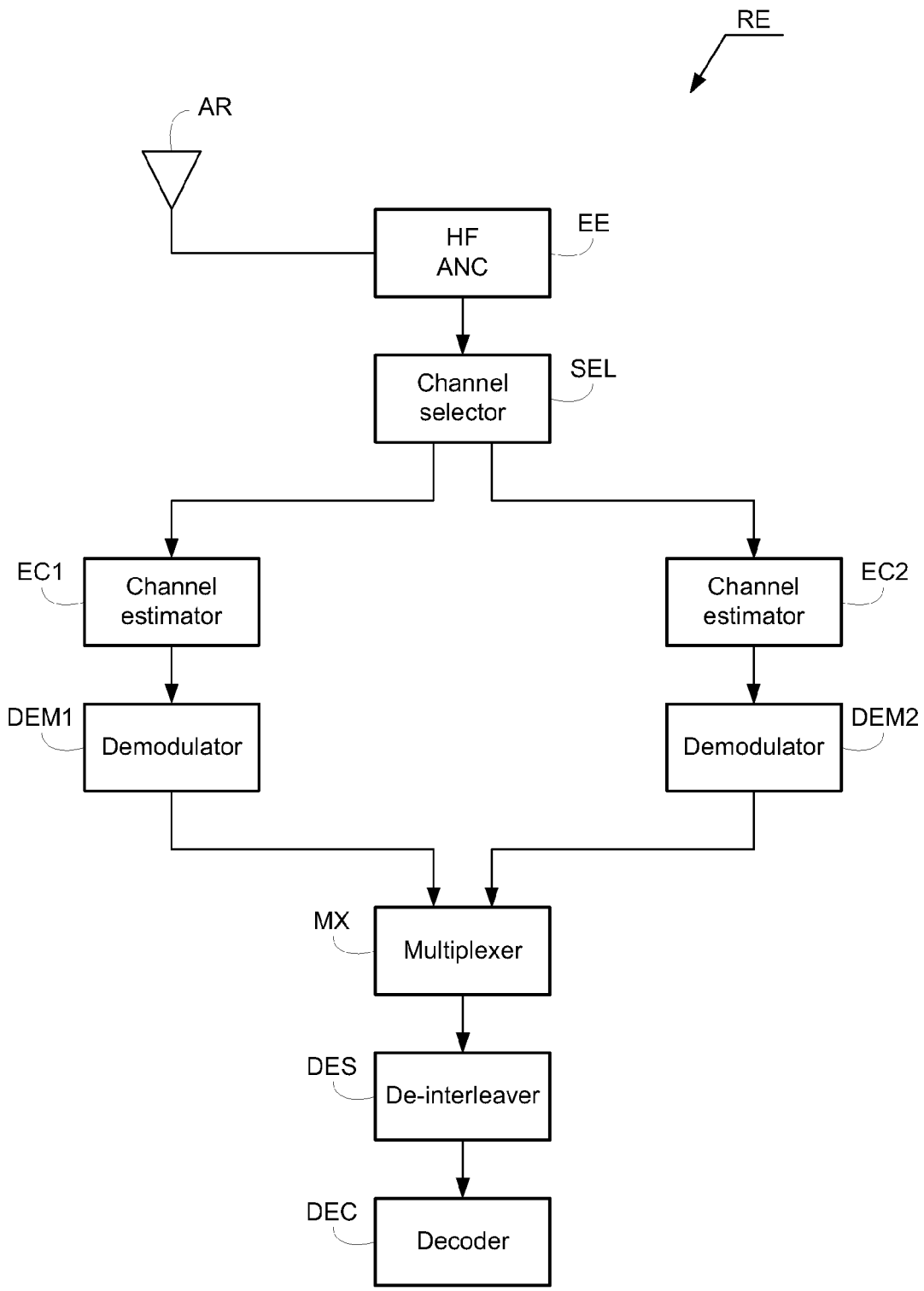
FIG. 2 is a schematic block diagram of a radio communication receiver with one antenna according to the invention.

FIG. 2 shows functional means included in a radio communication receiver RE for processing signals respectively emitted by the emit antennas of the emitter EM.

The receiver RE includes at least one receive antenna AR, an input stage EE, a channel selector SEL, a multiplexer MX, a de-interleaver DES and a channel decoder DEC. To avoid overloading FIG. 2, it will be considered hereinafter that the receiver RE further comprises at least two channel estimators EC1 and EC2, and two demodulators DEM1 and DEM2, each channel estimator and demodulator couple EC1-DEM1, EC2-DEM2 processing the signal being emitted by one respective of the emit antennas of the emitter. The receiver RE comprises as many channel estimator and demodulator couples as the number of emit antennas that the emitter comprises.

Each signal received by the receiver RE through the propagation channel between the emitter EM and the receiver RE goes through, for example, amplification, baseband transposition, analog-to-digital conversion and guard interval suppression stages in the input stage EE.

The channel selector SEL determines the propagation channel through which the received signal has been transmitted, i.e. the emit antenna from which the received signal has been emitted. It is supposed that the emitter and the receiver are synchronized, such that the channel selector SEL knows the emit antenna AE1, AE2 at the origin of the received signal and selects the channel estimator EC1, EC2 appropriate for the propagation channel of the received signal. For logic reason, it is supposed that the channel estimators EC1 and EC2 and the demodulators DEM1 and DEM2 process the signals respectively emitted by the emit antennas AE1 and AE2.

The channel estimator EC1, EC2 estimates the transfer function for the propagation channel of the received signal, for example, by using pilot symbols included in the received signal, such pilot symbols being preliminarily stored in a memory of the receiver. The channel estimator determines a channel estimate defined by estimated coefficients of the transfer function in the propagation channel between the emit antenna AE1, AE2 and the receiver.

The channel estimator EC1, EC2 further equalizes the received symbols to yield equalized symbols as a function of estimated coefficients of the transfer function of the propagation channel. For example, the equalized symbols depend on the division of the received symbols by the estimated coefficients.

The demodulator DEM1, DEM2 demodulates equalized symbols into demodulated bits, depending on the modulation type of the symbols, for example, depending on a quadrature amplitude modulation QAM4. Such equalized symbols can be stored and provided to the de-interleaver DES and/or to the decoder DEC.

Moreover, the demodulator DEM1, DEM2 determines a likelihood of each bit included in an equalized symbol. The likelihood has a negative or positive (floating) "soft" value, compared to a "hard" value such as the binary value "1" or "0", to indicate that the demodulator DEM provides real floating values each having a sign that imposes a subsequent decision on the state of the corresponding bit, namely a decision on the "hard" value "0" or "1". The likelihood amplitude represents the reliability of the subsequent decision and is a "flexible" value that represents a trust index of the binary state determined by the likelihood sign. For example, if such amplitude is small and close to 0, the binary state corresponding to the likelihood sign is not sure.

The multiplexer MX recovers the demodulated bits from the demodulators DEM1 and DEM2 and multiplexes the latter for forming a series of demodulated bits in the same order as the encoded bits provided to the modulator MOD of the emitter EM before the signal is emitted.

Optionally, if the bits of the received signal have been interleaved in the interleaver ENT before being emitted, the multiplexer MX serially provides the digital likelihood values of the demodulated bits to the de-interleaver DES. The latter de-interleaves the likelihoods of the demodulated bits according to a channel de-interleaving algorithm reciprocal to a channel interleaving algorithm used in the interleaver ENT of the emitter, so as to inhibit the interleaving introduced upon the emission of the signal.

The decoder DEC decodes the demodulated bits provided by the multiplexer MX, or optionally the de-interleaved bits supplied by the de-interleaver DES, as a function of the likelihoods previously determined. The decoder DEC implements a hard decision and provides decoded bits, according to the decoding corresponding to the coding used by the encoder COD upon the emission of the signal, for example, according to a convolutional decoding that corrects errors by means of the Viterbi algorithm.

After the bits are decoded, the receiver benefits from a diversity gain compared to the propagation channel through which the initial bit sequence SB has been emitted. The diversity of the propagation channel is thus recovered by decoding bits and optionally by de-interleaving bits having been distributed in the whole time-frequency reference system.

Alternatively, the receiver RE comprises plural receive antennas and plural channel selectors. The channel selectors are respectively associated with the receive antennas so as to determine, for each receive antenna, the propagation channel through which the received signal has been transmitted.

Figure 3:
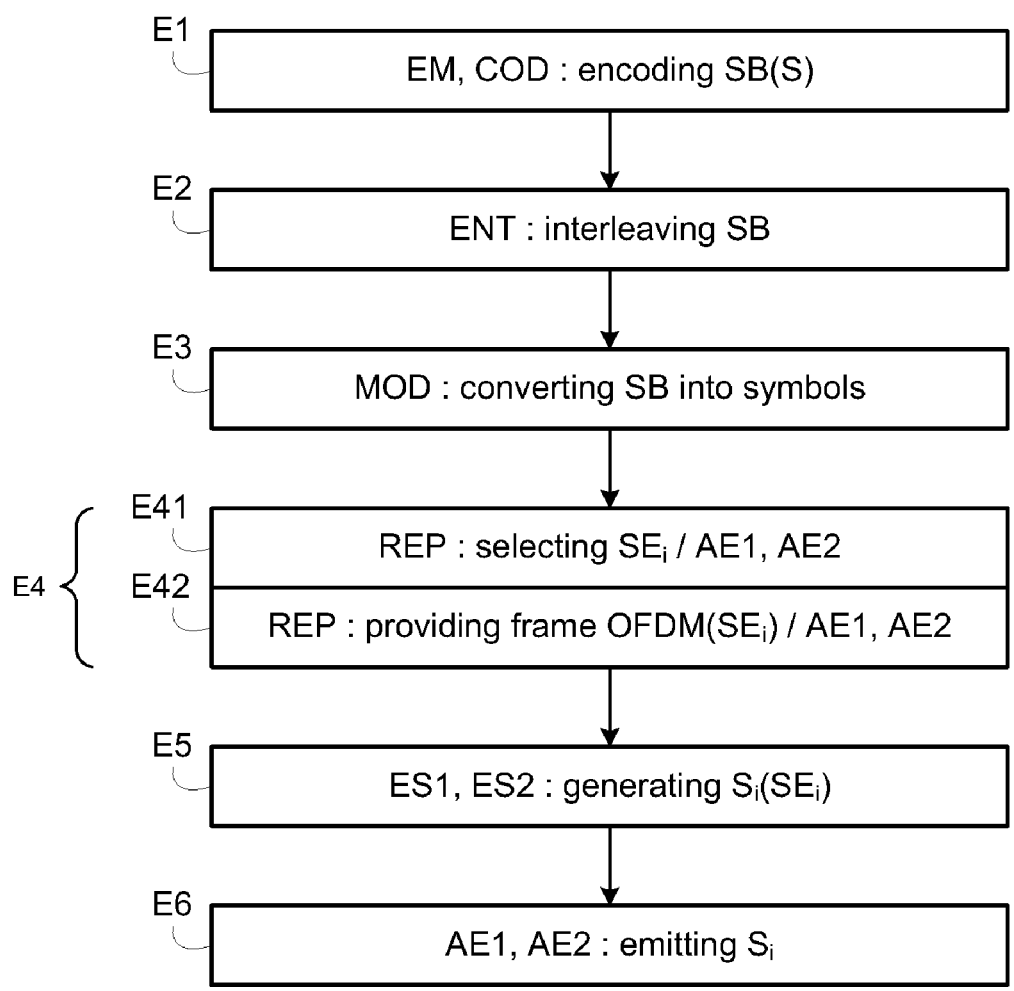
FIG. 3 is an algorithm of a signal emitting method according to the invention.

Referring to FIG. 3, the method according to this invention for emitting a signal includes steps E1 to E6 automatically executed in the emitter EM being supposed to comprise two emit antennas AE1 and AE2.

At step E1, the input of the emitter EM receives a bit sequence SB of a signal S to be emitted through the two emit antennas AE1 and AE2. The encoder COD encodes the bit sequence SB into an encoded bit sequence. The number of encoded bits is higher than the number of bits of the sequence SB. Generally speaking, the encoder COD adds some redundancy to the useful information, so that the receiver is able to detect and correct errors generated by the signal transmission through the propagation channel between the emitter EM and the receiver RE, upon decoding the signal by the receiver. The encoded bits are, for example, issued from either a block encoding or a convolutional encoding.

At the optional step E2, the bits encoded in the bit sequence SB are provided to the interleaver ENT and are interleaved according to a predetermined algorithm to form a sequence of interleaved bits. The content of each useful information bit is spread on a part of the sequence of interleaved bits.

For example, interleaving is random, so that all the encoded bits are mixed in the interleaved bit sequence.

At step E3, the modulator MOD converts the encoded bit sequence, optionally being interleaved, into symbols according to a multiplexing OFDM forming an OFDM signal frame. The symbols are distributed on M subcarriers orthogonal therebetween and covering a frequency broadband in a frame divided into N time intervals of consecutive symbols each dedicated to the transmission of M symbols. The content of each useful information bit is thus distributed at the time-frequency reference system, i.e., on different subcarriers and/or different time intervals. The modulator MOD provides the symbols to the signal divider REP.

At step E4, the signal divider REP distributes the symbols between the emit antennas so that the latter emit such symbols simultaneously for the duration of the OFDM signal frame, according to the sub-steps E41 and E42.

At the sub-step E41, the signal divider REP selects for each antenna a subset $SE_i$ of symbols, the positions of which are predetermined, with $1 \leq i \leq I$ and I being the number of antennas of the emitter. For example, positions of symbols in the time-frequency reference system were determined preliminarily for each of the emit antennas. Each selected subset of symbols $SE_i$ is dedicated to an emit antenna with which it is associated. In particular, symbols are distributed between at least two subsets for at least one time interval. Moreover, the selected subsets of symbols are disjointed and the union of the latter is equal to the whole symbols of the OFDM signal frame. The signal divider REP distributes thereby the set of the symbols in the OFDM signal frame in as many disjoined subsets $SE_i$ as the emitter comprises antennas. As an example, at least one symbol of each time interval is selected for each emit antenna.

In a particular case, the symbols of the OFDM signal frame are statistically equidistributed in the symbol subsets respectively associated with emit antennas. The subsets of symbols respectively selected for the antennas thus comprise a substantially identical number of symbols. As the emitter comprises two emit antennas, two distinct subsets of symbols are selected and each comprise substantially half the symbols of the OFDM signal frame. Alternatively, if the emitter comprises more than two antennas, the number of symbols associated with each antenna is substantially equal to the integer part of the product of the number of subcarriers by the number of time intervals divided by the number of emit antennas.

In another particular case, at each symbol time, i.e. at each of the N time intervals of the frame, each antenna is associated with the same number of symbols. For example, if the frequency band includes ten subcarriers, distinct five-symbol subsets are respectively associated with the two emit antennas AE1 and AE2 for each time interval. In addition, each antenna can be associated with a same number of symbols for each subcarrier of the signal.

At the sub-step E42, for each emit antenna, the signal divider REP places the selected subset of symbols $SE_i$ in the time-frequency reference system and completes the latter with nil values. Consequently, for each emit antenna an OFDM signal frame is provided, so that at each time interval, different subsets of symbols are to be emitted respectively by the antennas. In other words, this amounts to duplicating the OFDM signal frame for each of the emit antennas, selecting for each antenna a subset of symbols, the positions of which are predetermined, then resetting the unselected symbols. The OFDM signal frames produced respectively by the emit antennas have thus a pattern identical to that of the OFDM signal frame formed by the modulator MOD at the end of step E3.

Figure 4:
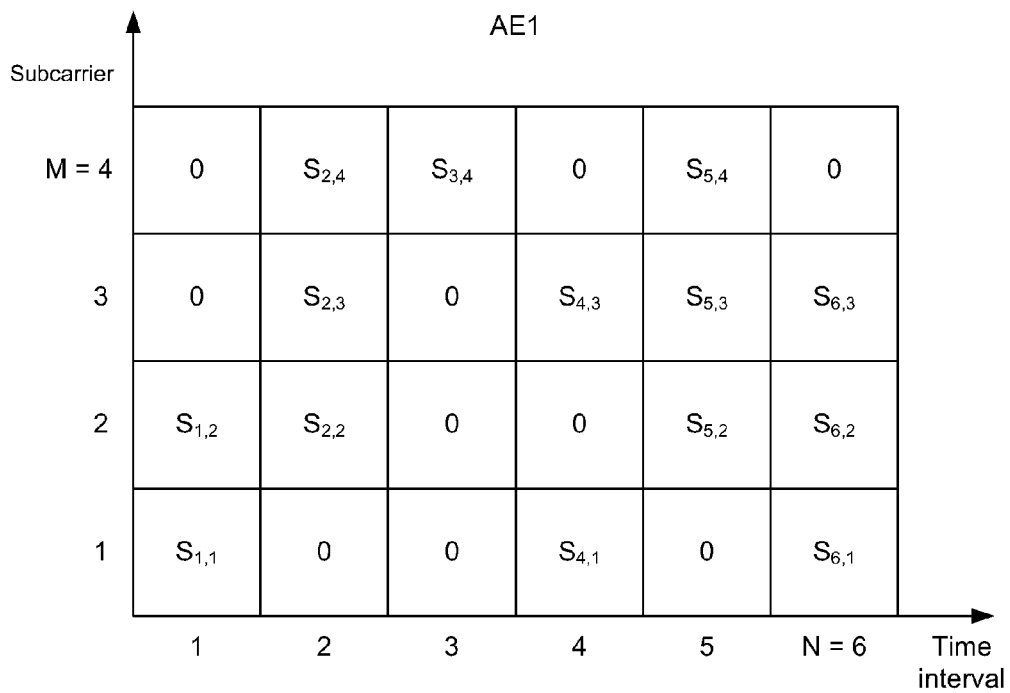
FIG. 4 shows an example of symbol distribution in a time-frequency reference system between two emit antennas according to the invention.
Figure 4:
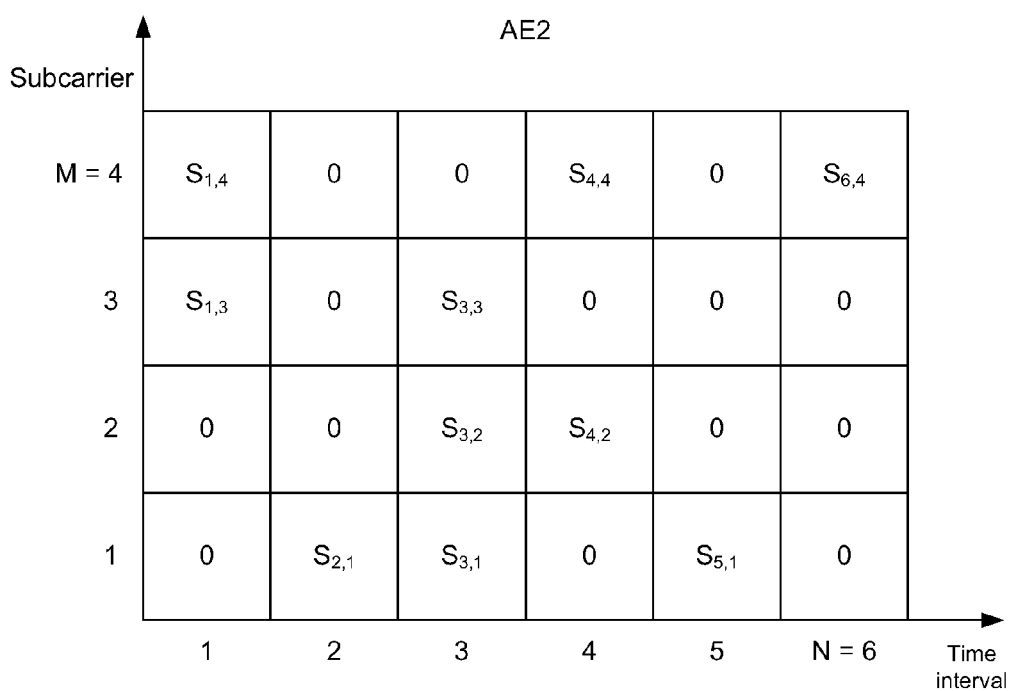

By way of an example shown on FIG. 4, the symbols of the OFDM signal frame are distributed in the time-frequency reference system on M=4 subcarriers and N=6 time intervals. The emitter comprises two emit antennas AE1 and AE2. Two distinct subsets of symbols are selected respectively for the latter and each comprise substantially half the symbols of the OFDM signal frame, i.e. 14 and 10 symbols respectively for the emit antennas AE1 and AE2. The notation $S_{n,m}$ represents a symbol to be emitted at the $n^{th}$ time interval on the $m^{th}$ subcarrier of the OFDM signal frame, with $1 \leq n \leq N$ and $1 \leq m \leq M$. For example, at the first time interval, symbols $S_{1,1}$ and $S_{1,2}$ are to be emitted respectively on the first and second subcarriers by the antenna AE1, whereas symbols $S_{1,3}$ and $S_{1,4}$ are to be emitted respectively on the third and fourth subcarriers by the antenna AE2, the two antennas AE1 and AE2 thus emitting an equal number of symbols.

At step E5, the signal divider REP provides OFDM signal frames produced respectively in the output stages ES1 and ES2. Each output stage ES1, ES2 applies a modulation on the subcarriers, then a digital-to-analog conversion, an amplification and a high frequency transposition to the symbols of the provided frame to generate a signal $S_i$ to be emitted by the emit antenna linked to the output stage, with $1 \leq i \leq I$ and I being the number of antennas of the emitter. The generated signal $S_i$ to be emitted by a given antenna thus comprises the symbols from the subset of symbols $SE_i$ dedicated to the given antenna, and each symbol of the subset is placed in the time-frequency reference system at the same position as that it was initially located in the OFDM signal frame.

At step E6, each generated signal $S_i$ is emitted by the antenna for which the signal has been generated. The emit antennas respectively emit the generated signals synchronously.

Generally, when the emitter comprises plural emit antennas, each symbol having a given position in the time-frequency reference system is emitted by one single antenna, whereas the other antennas do not emit any symbol for the given position in the time-frequency reference system.

The receiver RE then receives the different signals emitted by the emitter EM and benefits from a diversity gain after the received signal has been decoded as previously described. The low number of symbols emitted per time interval reduces the deviation between the power peaks and the average power of the emitted signal, i.e. the Peak-to-Average Power Ratio PAPR of the emitted signal. This ratio is all the more reduced as the symbols of the OFDM signal frame are equidistributed in frequency for each of the different time intervals and for each of the emit antennas.

The invention described here relates to a method and an emitter for emitting a signal by at least two antennas. In one implementation, the steps of the method of the invention are determined by the instructions of a computer program incorporated in the emitter. The program includes program instructions which carry out the steps of the method according to the invention when said program is executed in the emitter, whose operation is then controlled by the execution of the program.

Consequently, the invention also applies to a computer program, in particular a computer program stored on or in a storage medium readable by a computer and by any data processing device adapted to implement the invention. This program can use any programming language and take the form of source code, object code or an intermediate code between source code and object code, such as a partially compiled form, or any other form desirable for implementing the method according to the invention.

The storage medium can be any entity or device capable of storing the program. For example, the medium can include storage means in which the computer program according to the invention is stored, such as a ROM, for example a CD ROM or a microelectronic circuit ROM, a USB key, or magnetic storage means, for example a diskette (floppy disk) or a hard disk.

The invention claimed is:

1. A method in a radio communication emitter for emitting a signal by at least two antennas, said signal including encoded bits that are converted into symbols distributed on subcarriers and in time intervals, said method including:
   distributing a set of the signal symbols into as many disjoined subsets of signal symbols as said antennas that said emitter comprises, each subset being dedicated to one of said antennas, the union of said subsets being said set of said signal symbols, symbols being distributed in at least two subsets for at least one time interval, and symbols being distributed in at least two subsets for at least one subcarrier,
   generating for each antenna a signal to be emitted including said symbols of said subset dedicated to said each antenna, said symbols of said subset being distributed on the same subcarriers and in the same time intervals as those of said signal, and
   synchronously emitting, by a respective one of said antennas, the generated signals.

2. The method as claimed in claim 1, comprising interleaving said encoded bits before conversion of said encoded bits into said signal symbols.

3. A method as claimed in claim 1, wherein said subsets of symbols comprise a substantially identical number of symbols.

4. A method as claimed in claim 1, wherein said subsets of symbols comprise a substantially identical number of symbols for each time interval of said signal.

5. A method as claimed in claim 1, wherein said subsets of symbols comprise a substantially identical number of symbols for each subcarrier of said signal.

6. A radio communication emitter for emitting a signal by at least two antennas, said emitter being adapted to convert encoded bits in said signal into symbols distributed on subcarriers and in time intervals, said emitter including:
   means for distributing a set of the signal symbols into as many disjoined subsets of signal symbols as said antennas that emitter comprises, each subset being dedicated to one of said antennas, the union of said subsets being the set of said signal symbols, symbols being distributed in at least two subsets for at least one time interval, and symbols being distributed in at least two subsets for at least one subcarrier;
   means for generating for each antenna a signal to be emitted including said symbols of said subset dedicated to said each, said symbols of said subset being distributed on the same subcarriers and in the same time intervals as those of the signal; and
   at least two antennas arranged to synchronously emit the respective, generated signals.

7. A computer-readable storage medium or a computer-readable device storing a program for causing a data processor arrangement in an emitter to convert encoded bits in a signal into symbols distributed on subcarriers and in time intervals and to emit said signal by at least two antennas, said program including program instructions for causing said data processor arrangement to execute the following steps when the storage medium or computer-readable device is loaded into and executed in said data processor arrangement:

distributing a set of the signal symbols into as many disjoined subsets of signal symbols as said antennas that said emitter comprises, each subset being dedicated to one of said antennas, the union of said subsets being said set of said signal symbols, symbols being distributed in at least two subsets for at least one time interval, and symbols being distributed in at least two subsets for at least one subcarrier;

generating for each antenna a signal to be emitted including said symbols of said subset dedicated to said each antenna, said symbols of said subset being distributed on the same subcarriers and in the same time intervals as those of said signal; and synchronously emitting, by a respective one of said antennas, the generated signals.

\* \* \* \* \*